(12) United States Patent
Akers, Jr. et al.

(10) Patent No.: US 6,652,634 B1
(45) Date of Patent: Nov. 25, 2003

(54) POLYMERIC DISPERSANTS USED FOR AQUEOUS PIGMENTED INKS FOR INK-JET PRINTING

(75) Inventors: Charles Edward Akers, Jr., Lexington, KY (US); Terence Edward Franey, Lexington, KY (US); Jing X. Sun, Lexington, KY (US); Carla Marary Butler, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/921,486

(22) Filed: Aug. 3, 2001

(51) Int. Cl.$^7$ .............................................. C09D 11/00
(52) U.S. Cl. ..................... 106/31.13; 526/279; 526/72; 524/560; 524/588; 524/561; 524/81; 524/401; 524/806; 523/160
(58) Field of Search .................... 526/279, 72; 524/560, 524/160, 558, 561, 804, 806, 81, 401; 106/31.13

(56) References Cited

U.S. PATENT DOCUMENTS

| | | |
|---|---|---|
| 5,059,456 A | 10/1991 | Larson et al. |
| 5,242,489 A | 9/1993 | Schwarz, Jr. |
| 5,519,085 A | 5/1996 | Ma et al. |
| 5,725,647 A | 3/1998 | Carlson et al. |
| 5,821,283 A | 10/1998 | Hesler et al. |
| 5,852,074 A | 12/1998 | Tsutsumi et al. |
| 5,900,899 A | 5/1999 | Ichizawa et al. |
| 5,944,883 A | 8/1999 | Saibara et al. |
| 6,221,957 B1 | 4/2001 | Nzudie et al. |
| 6,225,370 B1 | 5/2001 | Suthar et al. |

OTHER PUBLICATIONS

George Odian, "Principles of Polymerization," Wiley–Interscience, 3rd ed., John Wiley & Sons, Inc. (New York), p. 715–720, (Aug. 3, 1991).

*Primary Examiner*—Robert Dawson
*Assistant Examiner*—Kuo-Liang Peng
(74) *Attorney, Agent, or Firm*—John A. Brady; Kilpatrick Stockton LLP

(57) ABSTRACT

The present invention relates to graft copolymers, useful as dispersants in ink jet ink compositions, which comprise two structurally distinct segments: a hydrophilic segment and a hydrophobic segment. The preferred hydrophilic segment is comprised preferably of a methacrylic acid polymer, or a copolymer thereof with another monomer, such as styrene sulfonic acid. The preferred hydrophobic segment comprises a polymer or copolymer containing electron rich functional groups comprised of a plurality of methacrylate derivatized monomers, preferably a methacrylate ester monomer, or a substituted methacrylate ester monomer (a methacrylate ester where the alkyl group is replaced with a siloxyl substituent, an oligomeric siloxane). The present invention also relates to aqueous ink compositions which include the polymeric dispersants of the present invention. A further embodiment of the present invention comprises a polymer comprising a monomeric hydrophobic head and a polymeric tail. In a preferred embodiment, the monomeric hydrophobic head is (ethylene glycol) 2,4,6-tris-(1-phenylethyl)phenyl ether.

63 Claims, No Drawings

POLYMERIC DISPERSANTS USED FOR AQUEOUS PIGMENTED INKS FOR INK-JET PRINTING

FIELD OF THE INVENTION

This invention belongs to the field of organic chemistry. In particular, it relates to dispersants useful in ink jet ink compositions.

BACKGROUND OF THE INVENTION

Ink jet printing is a non-impact method of printing that involves ejecting ink from a nozzle onto paper or other print media. The actual ink ejection method may occur via several processes including pressurized nozzles, electrostatic fields, piezoelectric elements within an ink nozzle, and heaters for vapor phase bubble formation.

The composition of the ink is traditionally comprised of deionized water, a water soluble organic solvent, and a colorant. The colorant may be a soluble dye or insoluble pigment. Several problems, however, are associated with soluble dyes that are not applicable to insoluble pigments. These problems include poor water-fastness, poor light-fastness, poor thermal stability, facile oxidation, dye crystallization, and ink bleeding and feathering on the print medium. To circumvent these problems, use of a pigment as the colorant is preferred. Pigments generally have better light-fast and water-fast properties, are more resistant to oxidation, and have higher thermal stability.

Use of a pigment instead of an aqueous dye presents solubility problems since the pigments are insoluble in aqueous media. As a result, the insoluble pigment is generally stabilized in a dispersion by a polymeric dispersant. Generally speaking most pigment inks stabilized by polymers in aqueous media are based on an electrosteric stabilizing mechanism in which a hydrophobic group in the dispersant acts as an anchor adsorbed on the pigment particle surface through an acid-base relation, electron donor/acceptor relation, Van der Waals forces, or physical absorption. The hydrophilic group is extended into the aqueous medium to keep the dispersant soluble. This results in a competition in the dispersing process between the pigment particle and the polymer, the polymer and the solvent, and the pigment particle and the solvent.

In order to form a stable polymeric dispersion, several factors are considered. First, the polymer must be firmly adsorbed to the pigment surface to withstand shear force and the competition of other chemical species. This requires a careful match of the polarity of the pigment surface to the hydrophobic group in the dispersant. Second, the physical dimensions of the hydrophobic group in the dispersant must be adequate to fully cover the pigment surface, otherwise, the adsorbed polymer will act as a flocculent. Third, an electrostatic layer of a requisite thickness around the particle is needed to repulse aggregation of particles within the aqueous medium.

Since carbon black and color pigments exhibit different hydrophilic-lipophilic balance (HLB) values[1] as well as different surface functional groups, the hydrophobic anchor groups that can be firmly adsorbed onto the carbon black surface do not interact well with the colored pigment surface. This poor interaction between the hydrophobic anchor and the colored pigment surface is further aggravated by the fact that the crystal structure of the pigment prevents full surface exposure of pigment particle functional groups. Van der Waals forces are not enough to stabilize the dispersion. This poor interaction between the hydrophobic anchor and the colored pigment allows for dispersion destabilization when other ink ingredients are introduced.

[1] Hydrophilic-lipophilic balance values are measured on an index where the lowest value (1) is lipophilic (oil soluble) and the top value (typically 20 or 36) is hydrophilic (water soluble).

The present invention provides a novel polymer that exhibits favorable interactions with the surface functional groups of colored pigment particles. These favorable interactions serve to increase dispersion stability of the ink in comparison with current hydrophobic anchors. This increased dispersion stability facilitates the production of higher quality colored pigment inks for use in ink jet printing applications.

SUMMARY OF THE INVENTION

The present invention relates to graft copolymers, useful as dispersants in ink jet ink compositions, having an average weight molecular weight from 2,500 to 20,000, preferably of from about 3000 to 15,000. The graft copolymers comprise monomers having electron rich functional groups, which exhibit favorable interactions with the surface functional groups of colored pigment particles thereby better stabilizing the color pigment dispersion within the aqueous ink composition. The polymers comprise two structurally distinct segments: a hydrophilic segment and a hydrophobic segment.

The preferred hydrophilic segment is comprised of acrylamidoalkylsulfonic acid, styrene sulfonic acid, or other acid, amide or amine (quaternary amine) containing monomers, preferably a methacrylic acid (MAA) polymer, or a copolymer thereof. Different acid or amine groups may be used together.

The preferred hydrophobic segment comprises a polymer or copolymer containing electron rich functional groups comprised of a plurality of methacrylate derivatized monomers, preferably a substituted methacrylate ester monomer (a methacrylate ester where the alkyl group is replaced with a siloxyl substituent, an oligomeric siloxane), preferably comprising the formula:

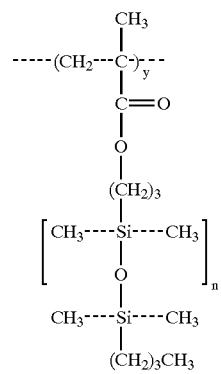

wherein n ranges from 1 to 20, y is 0, 1, or 2, and at least one monomer comprising a segment of the formula:

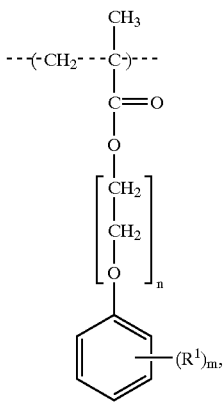

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl. The hydrophobic segment may include a $C_1$–$C_{20}$ alkythio functionality.

In a further embodiment of the present invention, a polymer comprising a monomeric hydrophobic head and a polymeric tail acts as a pigment dispersant stabilizing agent. The monomeric hydrophobic head comprises the formula:

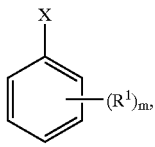

wherein m is an integer from 1 to 3, X is a polymerizable group, preferably O, N or S, and each $R^1$ is independently selected from $C_1$–$C_9$ alkyl, or aryl-$C_1$–$C_9$ alkyl, provided that at least one of said $R^1$ is aryl-$C_1$–$C_9$ alkyl. The tail comprises the formula:

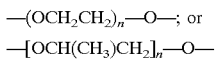

wherein n is from 0 to 50 and is attached to a poly (methacrylic acid) or poly(methacrylic acid) derivative backbone. In a preferred embodiment, $R^1$ is a styrene functionality, X is ethylene glycol or propylene glycol, and the length of the hydrophilic tail is set to n=25. In a more preferred embodiment, the monomeric hydrophobic head is (ethylene glycol) 2,4,6-tris-(1-phenylethyl)phenyl ether, and the length of the hydrophobic tail is set to n=25.

The present invention also relates to aqueous ink compositions which include those polymeric dispersants. Specifically, the dispersant compositions of the present invention for use in ink jet printers comprises from about 0.5% to about 10% of an insoluble pigment, from about 0.2% to about 10% of the polymeric dispersant described above, and an aqueous carrier.

All percentages and ratios, used herein, are "by weight" unless otherwise specified. All molecular weights, used herein, are number average molecular weights unless otherwise specified. As used herein, "pigment" refers to an insoluble colorant (including organic and inorganic pigments.)

Further details and advantages of the present invention are set forth below in the following more detailed description.

DETAILED DESCRIPTION OF THE INVENTION

The present invention relates to polymeric dispersants used to stabilize aqueous pigment ink compositions, as well as pigment ink compositions containing those dispersants. The polymers of the present invention have an average weight molecular weight of from about 2,500 to about 20,000, preferably of from about 3,000 to about 15,000. The polymers exhibit favorable interactions with the surface functional groups of colored pigment particles. These favorable interactions serve to increase dispersion stability of the ink in comparison with current hydrophobic anchors. This increased dispersion stability facilitates the production of higher quality colored pigment inks for use in ink jet printing applications. The polymers also assist in the redispersion of the pigment after drying out of the nozzle during printer shutdown. Finally, the polymers provide for the production of colored pigment inks having improved stability, flexibility for ink formation, and excellent print quality as compared to traditional aqueous dye inks.

The novel polymers of the present invention are graft copolymers comprising monomers having electron rich functional groups, which exhibit favorable interactions with the surface functional groups of colored pigment particles thereby better stabilizing the color pigment dispersion within the aqueous ink composition. The polymers comprise at least two structurally distinct segments: a hydrophilic segment and a hydrophobic segment. Each of these segments is described in detail below.

The hydrophilic portion of the polymer is responsible for controlling polymer solubility in the ink composition. Therefore, a monomer containing hydrophilic functional groups is preferred to ensure adequate solubility. Suitable hydrophilic functional groups will be known to those skilled in the art. Preferred hydrophilic functional groups, which accomplish this solubility requirement, include carboxylic acid groups, sulfonic acid groups, phosphate groups. Preferably, the hydrophilic segment is comprised of acrylamidoalkylsulfonic acid, styrene sulfonic acid, or other acid, amide or amine (quaternary amine )containing monomers, preferably a methacrylic acid (MAA) polymer, or a copolymer thereof. Different acid or amine groups may be used together. The carboxylic acid group in each methacrylic monomer provides adequate hydrophilicity for satisfactory solubility. The hydrophilic end must be long enough to ensure that it performs its stabilizing function for the dispersant. Consequently, the preferred ratio of the hydrophilic portion to the two hydrophobic portion ranges from 4:1:1 to 40:2:1, preferably 9:1:1 to 18:1:1.

In an alternative embodiment, the hydrophilic segment can comprise a methacrylic copolymer, such as a copolymer of MAA with another monomer, such as styrene sulfonic acid. Other suitable monomers will be known to those skilled in the art. Suitable monomers are preferably those which do not interfere with the hydrophilic character of the segment.

The hydrophobic segment is responsible for anchoring the polymeric dispersant to the pigment particle. The present invention has found that electron donor/acceptor interactions via aromatic groups and hydrogen bonding are ideal for effective binding between the pigment and the dispersant. When aromatic groups are used in the dispersant, and the more aromatic groups in the dispersant, the better the dispersion stability. Therefore, the preferred hydrophobic segment comprises a polymer or copolymer containing electron rich functional groups. Suitable electron rich functional groups will be known to those skilled in the art. Preferred electron-rich hydrophobic functional groups include alkyl aromatics or substituted aromatic groups. More preferred hydrophobic groups include SIPOMER/ SEM 25™, which can be purchased from Rhodia Inc., poly(ethylene glycol) 2,4,6-tris-(1-phenylethyl)phenyl ether methacrylate and its di and mono derivates, and polydimethylsiloxane and alkylphenylether of polyethylene glycol or polypropylene glycol groups.

A preferred hydrophobic segment of the present invention comprises a copolymer comprised of a plurality of methacrylate derivatized monomers, at least one monomer comprising a segment of the formula:

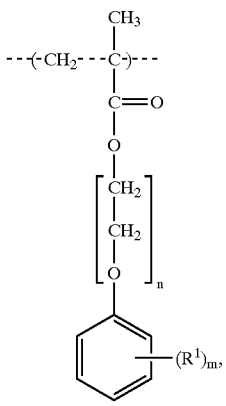

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl; more preferably the hydrophobic segment of the present invention comprises a copolymer comprised of a plurality of methacrylate derivatized monomers, at least one monomer comprising a segment of the formula:

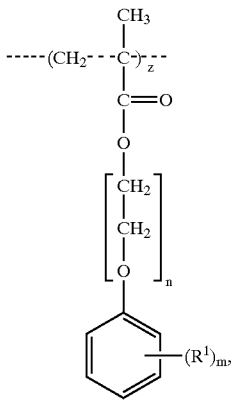

wherein n is an integer from 0 to 50, m is an integer from 1 to 3, z is an integer from 1 to 5, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

An alternative preferred embodiment of the hydrophobic segment of the present invention is a copolymer comprised of at least two methacrylate derivatized monomers, wherein at least one monomer comprises a substituted methacrylate ester monomer (a methacrylate ester where the alkyl group is replaced with a siloxyl substituent, an oligomeric siloxane,) comprising the formula:

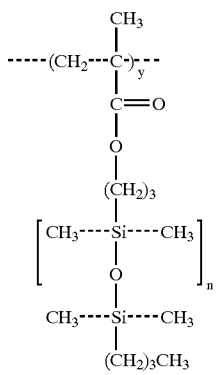

wherein n ranges from 1 to 20, y is 0, 1, or 2 and/or at least one monomer comprises (ethylene glycol) 2,4,6-tris(1-phenylethyl)phenyl ether methacrylate and comprises the formula:

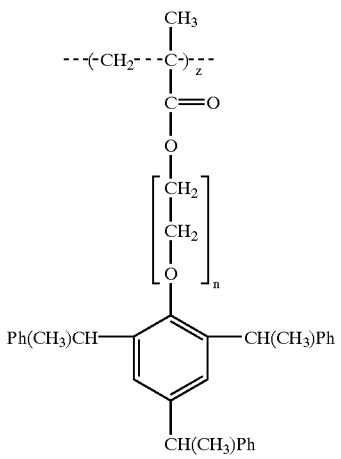

wherein n is 1 to 20, and z is an integer from 1 to 5.

The (ethylene glycol) 2,4,6-tris(1-phenylethyl)phenyl ether methacrylate monomer of the above formula functions as a dispersant stabilizer by firmly anchoring to the surface of the color pigment particle through electron donor/acceptor interactions. The electron rich nature of (ethylene glycol)2,4,6-tris(1-phenylethyl)phenyl ether methacrylate makes it an excellent hydrophobic color pigment anchor. By establishing a strong interaction with the color pigment surface, this monomer stabilizes the pigment dispersion. This strong interaction eliminates competing interactions between the pigment surface and other ink ingredients that serve to destabilize the dispersion leading to ink degradation.

The hydrophobic segment has a molecular weight of from about 400 to about 6,000, preferably of from about 900 to about 4,000.

The hydrophilic and hydrophobic segments are assembled into a graft copolymer. In a preferred embodiment, the backbone of the graft copolymer is comprised of random repeat units of MAA. (In another embodiment of the present invention, the backbone of the graft copolymer comprises random repeat units of MAA and the siloxyl substituted methacrylate ester monomer which constructs part of the hydrophobic segment.) The grafts comprise the hydrophilic and hydrophobic segments of the dispersant. The overall ratio of the hydrophilic monomer to the two hydrophobic monomers ranges from 4:1:1 to 40:2:1, preferably 9:1:1 to 18:1:1.

A further embodiment of the present invention comprises a polymer comprising random repeat units of:

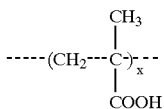

wherein x ranges from 4 to 40, preferably 9 to 36;

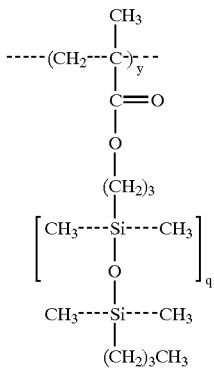

wherein q ranges from 1 to 20, and y is 0, 1, or 2; and

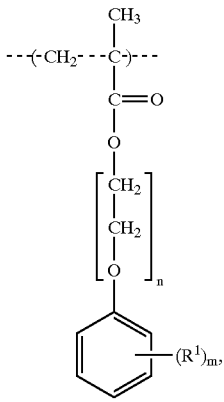

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

In a further embodiment of the present invention, a polymer comprising a monomeric hydrophobic head and a polymeric tail acts as a pigment dispersant stabilizing agent. The monomeric hydrophobic head comprises the formula:

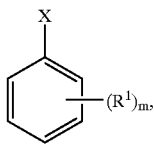

wherein m is an integer from 1 to 3, X is a polymerizable group, preferably O, N or S, and each $R^1$ is independently selected from $C_1$–$C_9$ alkyl, or aryl-$C_1$–$C_9$ alkyl, provided that at least one of said $R^1$ is aryl-$C_1$–$C_9$ alkyl. The hydrophilic tail comprises the formula:

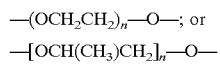

wherein n is from 0 to 50 and is attached to a poly (methacrylic acid) or poly(methacrylic acid) derivative backbone. In a preferred embodiment, $R^1$ is a styrene functionality, X is ethylene glycol or propylene glycol, and the length of the hydrophilic tail is set to n=25. In a more preferred embodiment, the monomeric hydrophobic head is (ethylene glycol) 2,4,6-tris-(1-phenylethyl)phenyl ether which can be purchased from Rhodia Inc. as SIPOMER/ SEM 25™, or synthesized from SynFac® from Milliken Inc. through a conventional synthetic method, and the length of the hydrophobic tail is set to n=25. Using this type of dispersant, the dispersion passes stability tests that dispersants relying only on Van der Waals interactions can not pass.

The graft copolymers of the present invention can be made by standard synthetic techniques such as those described in Odian's *Principles of Polymerization*, 3$^{rd}$ Edition, John Wiley and Sons, Inc. (1991), the disclosure of which is incorporated herein by reference. Free radical polymerization is the preferred method of synthesis. The specified monomer poly(ethylene glycol) 2,4,6-tris(1-phenylethyl)phenyl ether methacrylate and its di- and monoderivatives may also be purchased from , Rhodia Inc. as SIPOMER/SEM 25™, or synthesized from SynFac® (Milliken Inc.) or SOPROPHOR™ (Rhodia Inc.) through a conventional synthetic method.

The free radical polymerization reaction utilizes initiators and chain transfer agents to control the polymer molecular weight and terminate the reaction. Any conventional free radical initiator and chain transfer agent materials known in the art may be used in the present invention as long as they are compatible with the reactants being utilized. Suitable free radical initiators include the azo-type and peroxide-type initiators (preferably the azo-type). Preferred initiators include dimethyl 2,2'-azobisisobutyrate, and AIBN™ (Dupont) Preferred chain transfer agents include $C_1$–$C_{20}$ (preferably $C_8$–$C_{12}$) alkylthiol groups. Particularly preferred is n-$C_{12}$ thiol. Other appropriate chain transfer agents include phenylalkyl mercaptans, or 3-mercapto-1,2-propanediol.

Ink compositions of the present invention comprise the dispersant compositions of the present invention, an insoluble pigment, and an aqueous carrier. A wide variety of organic and inorganic pigments, alone or in combination, may be selected for use in the aqueous inks of the present invention. The key selection criteria for the pigment is that they must be dispersable in the aqueous medium. The term "pigment", as used herein, means an insoluble colorant. The selected pigment may be used in dry or wet form.

The amount of pigment used in the inks may vary depending on their structure, but generally the pigments are used in a range of from about 0.5% to about 10%, preferably of from about 2 to about 6%, by weight of the ink composition. The pigment to dispersant (weight) ratio is preferably about 3:1, but may vary from about 1:1 to about 9:1.

Suitable pigments include organic and inorganic pigments of a particle size sufficient to permit free flow of the ink through the ink jet printing device, especially at the ejecting nozzles that usually have a diameter ranging from about 10 microns to 50 microns. Thus, a suitable pigment particle size is from about 0.05 to about 15, preferably from about 0.05 to about 5, and more preferably from about 0.05 to about 1, micron. Pigments suitable for use in the present invention include azo pigments, such as azo lakes, insoluble azo pigments, condensed azo pigments and chelate azo pigments, polycyclic pigments, perylene pigments, anthraquinone pigments, quinacridone pigments, dioxazine pigments, thioindigo pigments, isoindolinone pigments, quinophthalone pigments, and dry lakes. Suitable organic pigments include nitro pigments, nitroso pigments, aniline black and daylight fluorescent pigments. Preferred pigments include carbon black, Pigment Red 122, Pigment Red 202, Pigment Yellow 74, Pigment Yellow 128, Pigment Yellow 138, Pigment Yellow 155, Pigment Blue 15:3 and Pigment Blue 15:4.

The third component of the ink composition of the present invention is the aqueous carrier medium which is generally present at from about 80% to about 99% of the composition. The aqueous carrier medium comprises water (preferably deionized water) and, preferably, at least one water soluble organic solvent. Selection of a suitable carrier mixture depends on the requirements of the specific application involved, such as desired surface tension and viscosity, the selected pigment, the desired drying time of the ink, and the type of paper onto which the ink will be printed. Representative examples of water soluble organic solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, fuirfryl alcohol, and tetrahydrofurfuryl alcohol; (2) ketones or ketoalcohols, such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol monomethyl (or monoethyl) ether, diethylene glycol monomethyl (or monoethyl) ether, propylene glycol monomethyl (or monoethyl) ether, triethylene glycol monomethyl (or monoethyl) ether and diethylene glycol dimethyl (or diethyl) ether; (7) nitrogen-containing cyclic compounds, such as pyrrolidone, N-methyl-2-pyrrolidone, and 1,3-dimethyl-2-imidazolidinone; and (8) sulfur-containing compounds, such as dimethyl sulfoxide and tetramethylene sulfone. Other useful organic solvents include lactones and lactams. Mixtures of these solvents may be used in the present invention.

Preferably the ink compositions comprise a humectant mixture. The preferred humectant mixture comprises a bis-hydroxy terminated thioether, a lactam, and polyalkylene glycols.

The ink compositions may also optionally comprise surfactants to modify the surface tension of the ink and to control the penetration of the ink into the paper. Such surfactants are included in the ink compositions, and are not a component of the dispersant. Suitable surfactants include nonionic, amphoteric and ionic surfactants, preferred surfactants include alkyl sulfate, nonyl phenyl polyethylene glycol, SILWET® (OSI Sealants, Inc.), TERGITOL® (Union Carbide) and SURFYNOL® (Air Products and Chemicals, Inc.).

Other additives, such as biocides, viscosity modifiers, penetrants, anti-kogation agents, anti-curling agents, chelating agents, anti-bleed agents, binders and buffers may optionally be added to the ink composition at their art established levels, although not necessary. A preferred biocide is Proxel®. GXL commercially available from Zeneca.

EXAMPLES

Examples of the free radical polymerization of polymeric dispersants of the present invention include those presented below. The examples are presented for illustrative purposes only, and are not intended as a restriction on the scope of the invention.

Examples A, B, and C

Polymeric dispersants of the present invention are made as follows: A solution of Methacrylic acid 8.08 g (9:1:1 ratio for A, or 23.5 g/15:1:1 ratio for B, and 31.3 g/18:1:1 ratio for C); SIPOMER SEM/25 80 g (containing 60% active ingredient, 20% methacrylic acid and 20% water); methacryloyl terminated polydimethylsiloxane 27 g (Mw 900); Dodecylthiol 4.5 g (6.4 g in B and 7.5 g in C); and dimethyl 2,2'-azobisisobutyrate (V-601™) from Waco Chemical & Supply Co. 0.3 g is mixed in 71 ml isopropyl alcohol(IPA) and 25 ml tetrahydrofuran(THF) in a three neck round bottom flask which is equipped with a mechanical stirrer, a condenser and a thermometer. The chemicals are mixed together and degassed with nitrogen (done by repeated partial evacuation followed by backfill using a Firestone Valve). The flask is back filled with the nitrogen, then immersed, in an oil bath and heated to about 75 C. for about 18 hours. A viscose solution is formed. The solution is dried in an explosion-proof oven and the molecular weight is determined by gel permeation chromatography. The Mw are around 11,000 and the $M_n$ is about 7,500.

The polymer dispersant stock solution is prepared in the following manner: The dried powder of the dispersant is dissolved in deionized water with heating. The temperature is controlled below 50° C. The pH is adjusted to 7.5 by addition of 20% KOH drop wise.

Dispersants are prepared by mixing the resulting dispersant solution with a pigment in the specified piginent-to-dispersant ratio in a mechanical stirrer until there are no visible lumps. The total percent of solid is controlled at 20%. The mixture is then dispersed by an attrition process using a Szegvari attritor model 01 std with YTZ ceramic beads, a Yttria stabilized media, obtainable from S. E. Firestone Associates of Philadelphia, Pa. The attrition process is typically performed for a minimum of five hours. However, longer times at controlled temperature can also be used. The pH can be adjusted with 20% KOH solution to maintain the pH at 7.5. The dispersion particle size determined by Leeds and Northrop Microtrac UPA 150 measurement is <150 nm. The solution is the diluted to 12–15% solid, and the final dispersion is subject for dispersion stability testing.

Examples D, E, F

Polymeric dispersants D, E and F of the present invention and subsequently polymer dispersant stock solutions and dispersions are prepared using the same procedure as for Examples A, B and C, with the exception that the following initial components in the following amounts and ratios are used: Methacrylic acid 8.08 g (9:1:1 ratio for D, 23.5 g/15:1:1 ratio for E, and 31.3 g/18:1:1 ratio for F); SIPOMER SEM/25 80 g (containing 60% active ingredient, 20% methacrylic acid and 20% water); nonylphenylpropylene glycol acrylate 12.6 g (Mw 450); Dodecylthiol 4.5 g (6.4 g in E and 7.5 g in F); dimethyl 2,2'-azobisisobutyrate (V-601™) from Waco Chemical & Supply Co. 0.3 g are mixed in 75 ml IPA. The Mw of the resultant dried solutions are around 14,000 and the $M_n$ is about 7,500.

Example J

Polymeric dispersant J of the present invention and subsequently polymer dispersant stock solutions and dispersions are prepared using the same procedure as for Examples A, B and C, with the exception that the following initial components in the following amounts and ratios are used: Methacrylic acid 8.08 g; SIPOMER SEM/25 80 g (containing 60% active ingredient, 20% methacrylic acid and 20% water); methacryloyl terminated polydimethylsiloxane 13.5 g (Mw 900); Dodecylthiol 4.5 g; (or 3-mercapto-1,2-propanediol 2.3 g); dimethyl 2,2'-azobisisobutyrate (V-601™) from Waco Chemical & Supply Co. 0.3 g are mixed in 75 ml IPA and 25 ml THF. Note: After the chemicals are mixed and degassed, the flask is back filled with the nitrogen, and immersed in an oil bath and heated to about 75 C for about 19 hours. The Mw of the resultant dried solutions are around 11,551 to 6,000 and the $M_n$ is about 7,500 to 3,500.

Examples K and L

Polymeric dispersants K and L of the present invention and subsequently polymer dispersant stock solutions and dispersions are prepared using the same procedure as for Examples A, B and C, with the exception that the following initial components in the following amounts and ratios are used: Methacrylic acid 23.5 g, 15:1:1 ratio for L (and 31.3 g, 18:1:1 ratio for K); SIPOMER SEM/25 80 g (containing 60% active ingredient, 20% methacrylic acid and 20% water); methacryloyl terminated polydimethylsiloxane 13.5 g (Mw 900); Dodecylthiol 6.2 g (and 7.3 g for L); dimethyl 2,2'-azobisisobutyrate (V-601™) from Waco Chemical & Supply Co. 0.3 g are mixed in 75 ml IPA and 25 ml THF. The Mw of the resultant dried solutions are around 11,000 and the $M_n$ is about 7,500.

DISPERSANT TESTING

The polymeric dispersion made from Dispersants A, B, C, D, E, F, J, K, and L was stability tested for pigment dispersing capacity. The dispersion stability testing was administered by mixing each dispersion with several ink additives (a high concentration penetrant, a low concentration penetrant and two surfactants), or itself. The resulting solution was then stored for 90 days at 60° C. If any mixture particle size increased over 100 nm from its original size, the corresponding dispersant in the mixture failed the stability test. A control polymer was constructed from monomers without SIPOMER/SEM 25™.

The results of the stability testing are displayed below:

| Dispersant | Monomer ratio | Carbon Black | PR122 | PY74 |
|---|---|---|---|---|
| A | 9:1:1 | pass | pass | pass |
| B | 15:1:1 | pass | pass | pass |
| C | 18:1:1 | pass | pass | pass |
| D | 9:1:1 | fail one | fail one | pass |
| E | 15:1:1 | pass | fail one | pass |
| F | 18:1:1 | pass | fail one | pass |
| J | 18:2:1 | pass | pass | pass |
| K | 30:2:1 | pass | ** | ** |
| L | 36:2:1 | pass | ** | ** |
| Control | 22:1:1 | fail | fail | fail |

As seen, the polymeric dispersants of the present invention exhibit superior stabilizing ability in a wide array of ink additive mixtures when compared to the control ink dispersions. The control ink dispersions failed nearly every stability test[2] (it barely passed only the low concentration penetrant test), while the new dispersants passed a high percentage of the tests. Specifically, the Examples A, B and C dispersions passed every stability test. Some of the dispersions demonstrated failing results with one of the three tested pigments; however, and no single dispersant failed across the board as the control did. Dispersions made from dispersant D, E and F, for instance, failed only the high concentration penetrant test. In sum, the novel polymeric dispersants of the present invention are effective agents for producing higher quality and more stable pigment dispersions for use in ink jet applications.

[2] The control ink dispersion is made from dispersant containing methacrylic acid hydrophilic monomer, polydimethylsiloxane and stearyl methacrylate. No aromatic functionality was involved in the dispersant. Particle size increased from 100 nm to 400 to 600 nm in the 60 C oven.

INK TESTING

An ink was prepared from the polymeric dispersion made from Dispersants A, C, and J above, in the formulation given below:

| Component | Amount |
|---|---|
| Dispersion preparation | (The Pigment to dispersant ration is 3:1) |
| Pigment | 3% |
| Thiodiethanol | 5% |
| Polyethylene glycol 1000 | 5% |
| 2-pyrrolidinone | 5% |
| Hexanediol | 1% |
| Deionized Water | Balance |

The results of the ink testing are displayed below:

| Ink | Dispersant A | Dispersant C | Dispersant J | Control |
|---|---|---|---|---|
| Particle: Dispersant Ratio | 3:1 | 3:1 | 3:1 | 3:1 |
| Particle Size | 26 nm | 146 nm | 20 nm | 24 nm |
| Viscosity | 3.20 | 3.03 | 2.03 | 2.40 |
| Surface Tension | 46.0 | 45.0 | 44.3 | 47.0 |
| pH | 8 | 8 | 8 | 8 |
| Optical Density | ** | ** | 1.42 | 1.39 |
| Startup/24 hr | 100% | 100% | 100% | 97% |
| Idle Time[3] | 20.0 | 18.0 | 18.7 | 8.0 |
| Million Fire[4] | 18.0 | 18.0 | 12.0 | 1.3 |
| End of Life[5] | 89% | 94% | 89% | ** |

[3] Idle Time for an ink formulation is determined by first printing reference droplets for all nozzles from an ink cartridge at time zero on a print media. The cartridge is then allowed to idle for specific intermittent periods of time before again firing the same nozzle to print test drops in the vicinity of the reference droplets. The idle time is increased incrementally between nozzle firings. The position of the test drops on the paper is then compared with the reference droplets. The period of time between nozzle firings at which the test drops are delayed or misdirected with respect to the reference droplets is noted and represents the idle time.
[4] Million Fire represents a method of quantifying the lifetime of a thermal inkjet print head. The print head fires or is heated by electrical resistors every 1.1–2.0 μs in order to form the ink bubbles responsible for printing. Due to this brief heating time, a print head is capable of firing millions of times over its lifetime. Therefore, a unit of million fire (corresponding to 1 million print head heatings) represents the number of fires in the lifetime of a print head.
[5] End of Life represents the time period where the performance of a printing device begins to expire. It applies to all types of printing hardware, including toner drums, ink jet print heads, electrostatic charging layers. End of life is used to characterize a printing device's failing performance in comparison with its initial performance. This allows quantification of the device's wear and degradation over its lifetime.

While various preferred embodiments, and Examples of the invention, have been described in detail and by way of illustration, it will be understood that various modifications and substitutions may be made in the described embodiments without departing from the spirit and scope of the invention as defined by the appended claims.

What is claimed is:

1. A polymer with a weight average molecular weight of from 4,000–20,000, number average molecular weight of 2,500–10,000 comprising (a) a hydrophilic polymeric segment; and (b) a hydrophobic polymeric segment comprising a copolymer comprising a plurality of methacrylate derivatized monomers.

2. The polymer of claim 1, wherein at least one of said methacrylate derivatized monomers comprises a segment which incorporates a siloxy substituent.

3. The polymer of claim 1, wherein at least one of said methacrylate derivatized monomers comprises a segment of the formula:

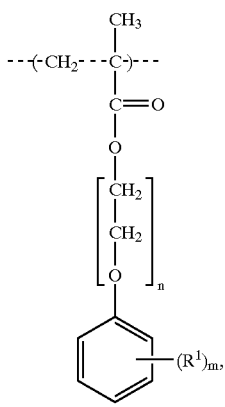

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

4. The polymer of claim 1, wherein at least one of said methacrylate derivatized monomers comprises a segment of the formula:

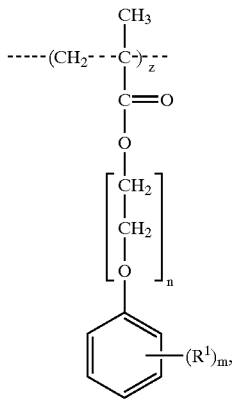

wherein z is an integer from 1 to 5, n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

5. The polymer of claim 1, wherein at least one of said methacrylate derivatized monomers comprises a segment of the formula:

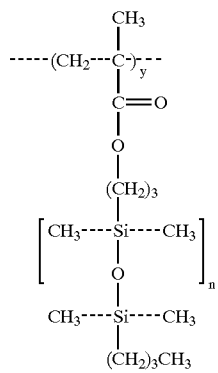

wherein n ranges from 1 to 20, y is 0, 1, or 2.

6. The polymer of claim 1, wherein at least one of said methacrylate derivatized monomers comprises (ethylene glycol) 2,4,6-tris(1-phenylethyl)phenyl ether methacrylate.

7. The polymer of claim 1, wherein at least one of said methacrylate derivatized monomers comprises a segment of the formula:

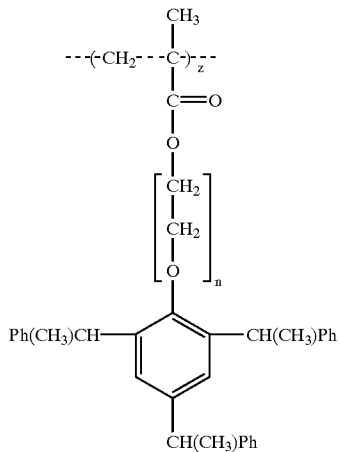

wherein n is 1 to 20, and z is an integer from 1 to 5.

8. The polymer of claim 1, wherein said hydrophobic segment has a weight average molecular weight of from about 400 to about 6,000.

9. The polymer of claim 1, wherein said hydrophobic segment has a weight average molecular weight of from about 900 to about 4,000.

10. The polymer of claim 1, wherein said polymer is a graft copolymer.

11. The polymer of claim 10, wherein said graft copolymer is comprised of a backbone comprised of random repeat units of methacrylic acid.

12. The polymer of claim 10, wherein said graft copolymer is comprised of a backbone comprised of random repeat units of methacrylic acid and a siloxyl substituted methacrylate ester monomer.

13. The polymer of claim 1, wherein said hydrophilic polymeric segment comprises at least one hydrophilic monomer and said hydrophobic polymeric segment comprises at least two methacrylate derivatized monomers, wherein the ratio of the at least one hydrophilic monomer to the at least two methacrylate derivatized monomers is from about 4:1:1 to 40:2:1.

14. The polymer of claim 1, wherein said hydrophilic polymeric segment comprises at least one hydrophilic monomer and said hydrophobic polymeric segment comprises at least two methacrylate derivatized monomers, wherein the ratio of the at least one hydrophilic monomer to the at least two methacrylate derivatized monomers is from about 9:1:1 to 18:1:1.

15. A polymer comprising (a) a monomeric hydrophobic head; and (b) a polymeric tail attached to a poly(methacrylic acid) or poly(methacrylic acid) derivative backbone, wherein the monomeric hydrophobic head comprises the formula:

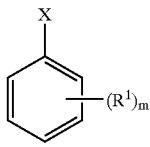

wherein m is an integer from 1 to 3, X comprises a O, N, or S group, and each $R^1$ is independently selected from $C_1$–$C_9$ alkyl, or aryl-$C_1$–$C_9$ alkyl, provided that at least one of said $R^1$ is aryl-$C_1$–$C_9$ alkyl; and wherein the poly(methacrylic acid) or poly(methacrylic acid) derivative backbone comprises between 4 and 40 monomer units of methacrylic acid.

16. The polymer of claim 15, wherein the polymeric tail comprises the formula:

wherein n is from 0 to 50.

17. The polymer of claim 15, wherein the polymeric tail comprises the formula:

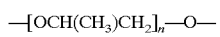

wherein n is from 0 to 50.

18. The polymer of claim 15, wherein (a) the monomeric hydrophobic head comprises the formula:

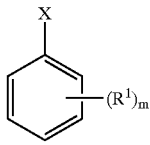

wherein m is 3, X is ethylene glycol, and each $R^1$ comprises a 1-phenylethyl group.

19. The polymer of claim 18, wherein the polymeric tail comprises the formula:

wherein n is 25.

20. The polymer of claim 18, wherein the polymeric tail comprises the formula:

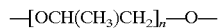

wherein n is 25.

21. A polymer comprising random repeat units

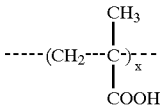

wherein x ranges from 4 to 40;

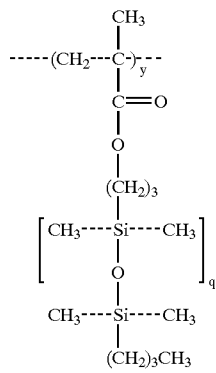

wherein q ranges from 1 to 20, and y is 0, 1, or 2; and

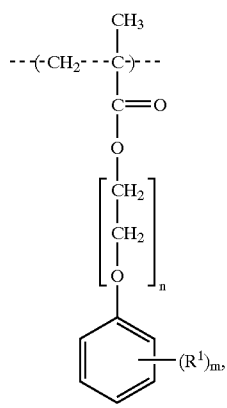

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

22. The polymer of claim 21, wherein x ranges from 9 to 36.

23. The polymer of claim 21, further comprising at least one random repeat unit of the formulae:

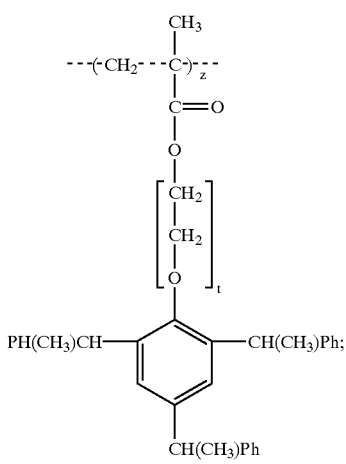

wherein the relative proportion of x:y:z ranges from about 4:1:1 to 40:2:1 and t is 0 to 50.

24. The polymer of claim 23 wherein the relative proportion of x:y:z ranges from about 9:1:1 to 18:1:1.

25. The polymer of claim 21, wherein the weight average molecular weight of the portion of said polymer derived from the monomers

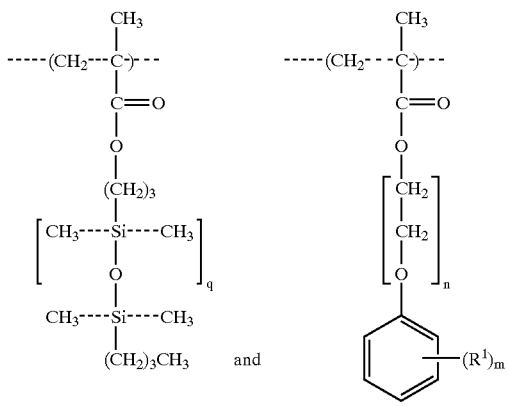

is from about 400 to about 6,000.

26. The polymer of claim 21, wherein the weight average molecular weight of the portion of said polymer derived from the monomers

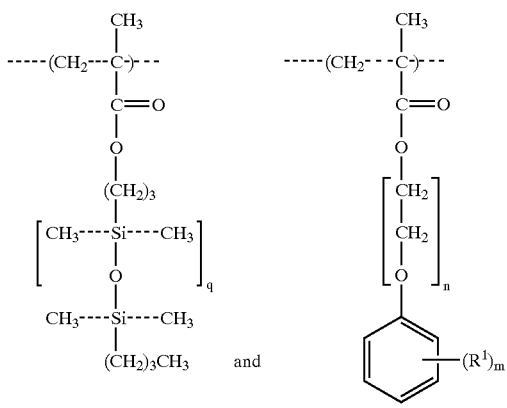

is from about 900 to about 4,000.

27. An ink composition comprising
   (a) at least one pigment;
   (b) aqueous carrier; and
   (c) a polymer comprising
      (i) a hydrophilic polymeric segment; and
      (ii) a hydrophobic polymeric segment comprising a copolymer comprising a plurality of methacrylate derivatized monomers, wherein at least one of said methacrylate derivatized monomers comprises a segment of the formula:

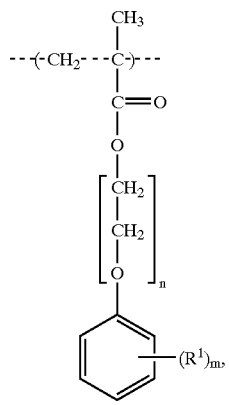

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

28. The ink composition of claim 27, wherein at least one of said methacrylate derivatized monomers comprises a segment which incorporates a siloxy substituent.

29. The ink composition of claim 27, wherein at least one of said methacrylate derivatized monomers comprises a segment of the formula:

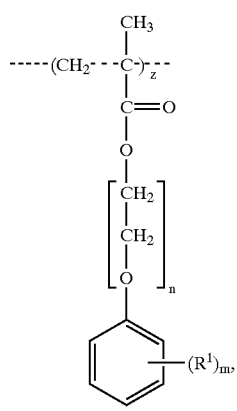

wherein z is an integer from 1 to 5, n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

30. The ink composition of claim 27, wherein the polymer comprises at least two methacrylate derivatized monomers, wherein at least one monomer comprises the formula:

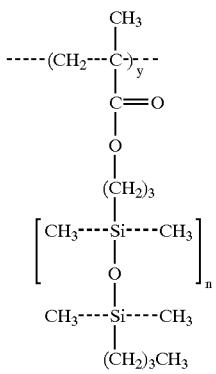

wherein n ranges from 1 to 20, y is 0,1, or 2.

31. The ink composition of claim 29, wherein said polymer is comprised of at least two methacrylate derivatized monomers, wherein at least one monomer comprises (ethylene glycol) 2,4,6-tris(1-phenylethyl)phenyl ether methacrylate.

32. The ink composition of claim 27, wherein said polymer is comprised of at least two methacrylate derivatized monomers, wherein at least one monomer comprises the formula:

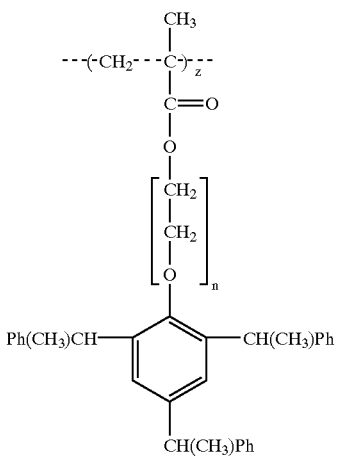

wherein n is 1 to 20, and z is an integer from 1 to 5.

33. The ink composition of claim 27, wherein said polymer is a graft copolymer.

34. The ink composition of claim 33, wherein said graft copolymer is comprised of a backbone comprised of random repeat units of methacrylic acid.

35. The ink composition of claim 33, wherein said graft copolymer is comprised of a backbone comprised of random repeat units of methacrylic acid and a siloxyl substituted methacrylate ester monomer.

36. The ink composition of claim 27, wherein said hydrophilic Polymeric segment comprises at least one hydrophilic monomer and said hydrophobic polymeric segment comprises at least two methacrylate derivatized monomers, wherein the ratio of the at least one hydrophilic monomer to the at least two methacrylate derivatized monomers is from about 4:1:1 to 40:2:1.

37. The ink composition of claim 27, wherein said hydrophilic polymeric segment comprises at least one hydrophilic monomer and said hydrophobic polymeric segment comprises at least two methacrylate derivatized monomers, wherein the ratio of the at least one hydrophilic monomer to the at least two methacrylate derivatized monomers is from about 9:1:1 to 18:1:1.

38. An ink composition comprising (a) at least one pigment;

(b) aqueous carrier; and (c) a polymer comprising
  (i) a monomeric hydrophobic head; and
  (ii) a polymeric tail attached to a poly(methacrylic acid) or poly(methacrylic acid) derivative backbone,
  wherein the monomeric hydrophobic head comprises the formula:

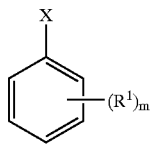

wherein m is an integer from 1 to 3, X comprises a O, N, or S group, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

39. The ink composition of claim 38, wherein the polymeric tail comprises the formula:

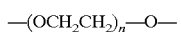

wherein n is from 0 to 50.

40. The ink composition of claim 38, wherein the polymeric tail comprises the formula:

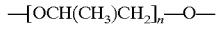

wherein n is from 0 to 50.

41. The ink composition of claim 38, wherein (a) the monomeric hydrophobic head comprises the formula:

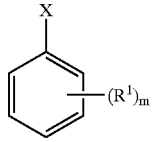

wherein m is 3, X is ethylene glycol, and each $R^1$ comprises a 1-phenylethyl group.

42. The ink composition of claim 41, wherein the polymeric tail is of the formula:

wherein n is 25.

43. The ink composition of claim 41, wherein the polymeric tail is of the formula:

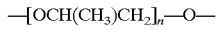

wherein n is 25.

44. The ink composition of claim 38, comprising random repeat units

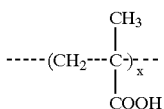

wherein x ranges from 4 to 40;

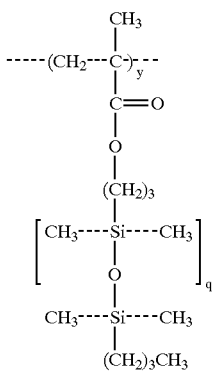

wherein q ranges from 1 to 20, and y is 0, 1, or 2; and

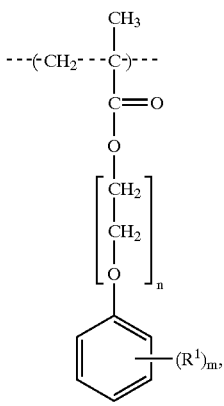

wherein n is an integer from 0 to 50, m is an integer from 1 to 3, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

45. The ink composition of claim 44, wherein x ranges from 9 to 36.

46. The ink composition of claim 44, further comprising at least one random repeat unit of the formulae:

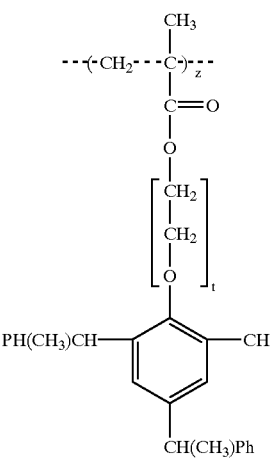

wherein the relative proportion of x:y:z ranges from about 4:1:1 to 40:2:1 and t is 0 to 50.

47. The ink composition of claim 46, wherein the relative proportion of x:y:z ranges from about 9:1:1 to 18:1:1.

48. The polymer of claim 1, wherein the copolymer of the hydrophobic polymeric segment further comprises:

(a) a monomeric hydrophobic head; and (b) a polymeric tail attached to a poly(methacrylic acid) or poly(methacrylic acid) derivative backbone.

49. The polymer of claim 48, wherein the monomeric hydrophobic head comprises the formula:

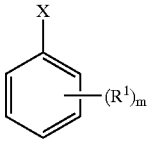

wherein m is an integer from 1 to 3, X comprises a O, N, or S group, and each $R^1$ is independently selected from $C_1$–$C_9$ alkyl, or aryl-$C_1$–$C_9$ alkyl, provided that at least one of said $R^1$ is aryl-$C_1$–$C_9$ alkyl.

50. The polymer of claim 48, wherein the polymeric tail comprises the formula:

—(OCH$_2$CH$_2$)$_n$—O— wherein n is from 0 to 50.

51. The polymer of claim 48, wherein the polymeric tail comprises the formula:

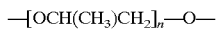

—[OCH(CH$_3$)CH$_2$]$_n$—O— wherein n is from 0 to 50.

52. The polymer of claim 48, wherein (a) the monomeric hydrophobic head comprises the formula:

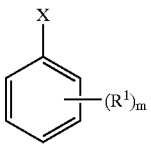

wherein m is 3, X is ethylene glycol, and each $R^1$ comprises a 1-phenylethyl group.

53. The polymer of claim 52, herein the polymeric tail is of the formula:

—(OCH$_2$CH$_2$)$_n$—O— wherein n is 25.

54. The polymer of claim 44, wherein the polymeric tail is of the formula:

wherein 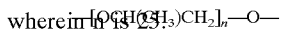

55. The polymer of claim 11, wherein the graft polymer comprises 4 to 40 units of methacrylic acid, and wherein the graft polymer further comprises random repeat units of

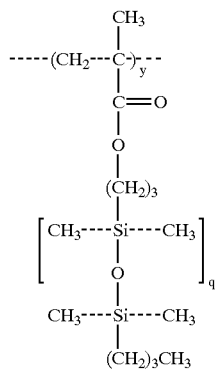

wherein q ranges from 1 to 20, and y is 0, 1, or 2; and

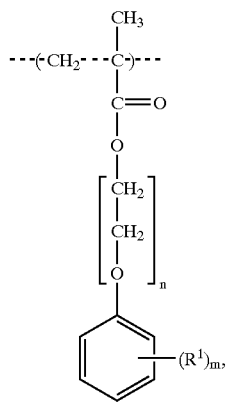

wherein n is an integer from 0 to 50, m is an integer from 1 to 3, and each R$^1$ is independently selected from C$_1$–C$_9$ alkyl, or aryl-C$_1$C$_9$ alkyl provided that at least one of said R$^1$ is aryl-C$_1$–C$_9$ alkyl.

56. The polymer of claim 55, wherein x ranges from 9 to 36.

57. The polymer of claim 55, further comprising at least one random repeat unit of the formula:

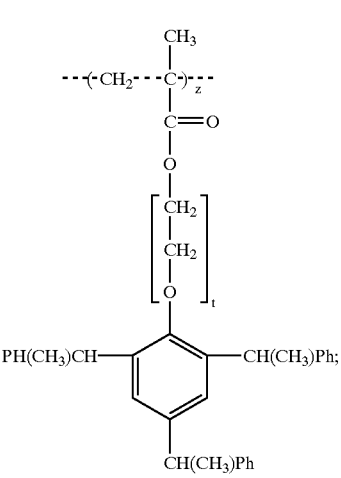

wherein the relative proportion of x:y:z ranges from about 4:1:1 to 40:2:1 and t is 0 to 50.

58. The polymer of claim 57, wherein the relative proportion of x:y:z ranges from about 9:1:1 to 18:1:1.

59. The polymer of claim 55, wherein the weight average molecular weight of the hydrophobic polymeric segment is from about 400 to about 6,000.

60. The polymer of claim 55, wherein the weight average molecular weight of the hydrophobic polymeric segment is from about 900 to about 4,000.

61. An article of manufacture comprising the polymer of claim 1.

62. The polymer of claim 15, wherein the polymer comprises random repeat units

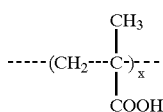

wherein x ranges from 4 to 40;

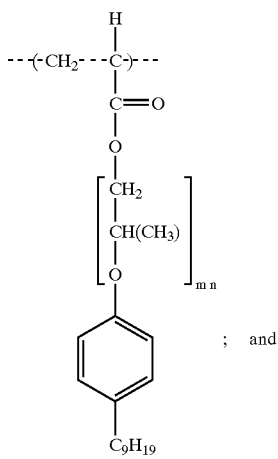

; and

-continued
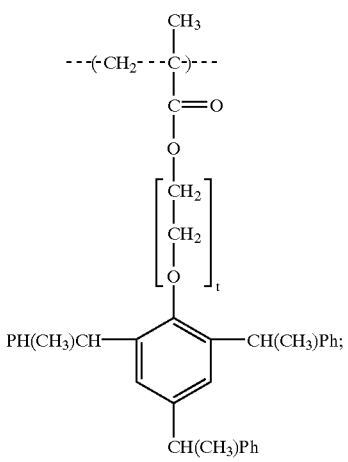
wherein t and n are equal to 0 to 50.
63. The ink composition of claim 38, wherein the polymer comprises random repeat units
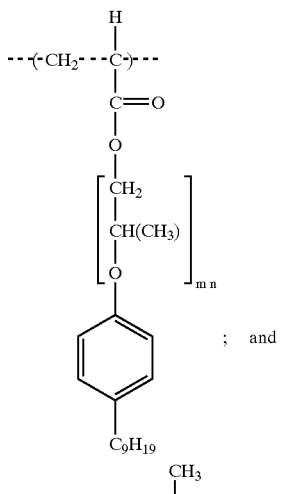
; and
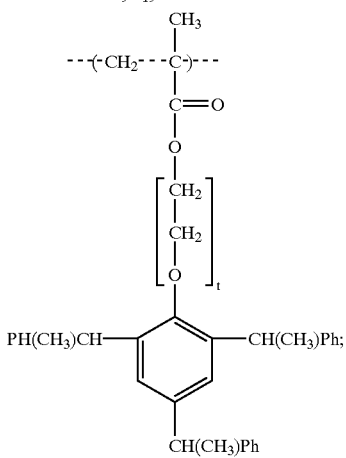
wherein t and n are equal to 0 to 50.
* * * * *
where x ranges from 4 to 40;